United States Patent [19]

Robinson, Jr.

[11] Patent Number: 4,705,551

[45] Date of Patent: Nov. 10, 1987

[54] TEST TUBE MAKING AND END COATING

[75] Inventor: E. Howell Robinson, Jr., Harriman, Tenn.

[73] Assignee: Chase Instruments Corporation, Glens Falls, N.Y.

[21] Appl. No.: 899,485

[22] Filed: Aug. 22, 1986

[51] Int. Cl.⁴ .............................................. C03B 23/11
[52] U.S. Cl. ...................... 65/60.1; 65/113; 65/181; 65/270; 65/285; 118/219; 118/232
[58] Field of Search ................ 65/60.1, 113, 181, 270, 65/285; 118/219, 232

[56] References Cited

U.S. PATENT DOCUMENTS

| | | | |
|---|---|---|---|
| 2,639,554 | 5/1953 | Zons | 65/285 X |
| 2,682,253 | 6/1954 | Scherer et al. | 118/219 |
| 3,170,782 | 2/1965 | Koenig | 65/270 X |
| 4,604,965 | 8/1986 | Dehais | 118/219 |

Primary Examiner—Arthur Kellogg
Attorney, Agent, or Firm—Stoll, Wilkie, Previto & Hoffman

[57] ABSTRACT

A machine for making and painting test tubes by painting open-ended tubes and then fusing and severing them to form individual test tubes.

Substitutable paint applicators varying in width, adjustable in location relative to the open-ended tubes, apply paint thereto by means of wiping action caused by rotating said open-ended tubes while in engagement with said paint applicators. The open-ended tubes are then individually fused and severed intermediate their open ends to form, from each open-ended tube, two separate test tubes having painted bands of the desired width and at the desired location, including painted bands which are contiguous with the open ends of the test tubes.

6 Claims, 9 Drawing Figures

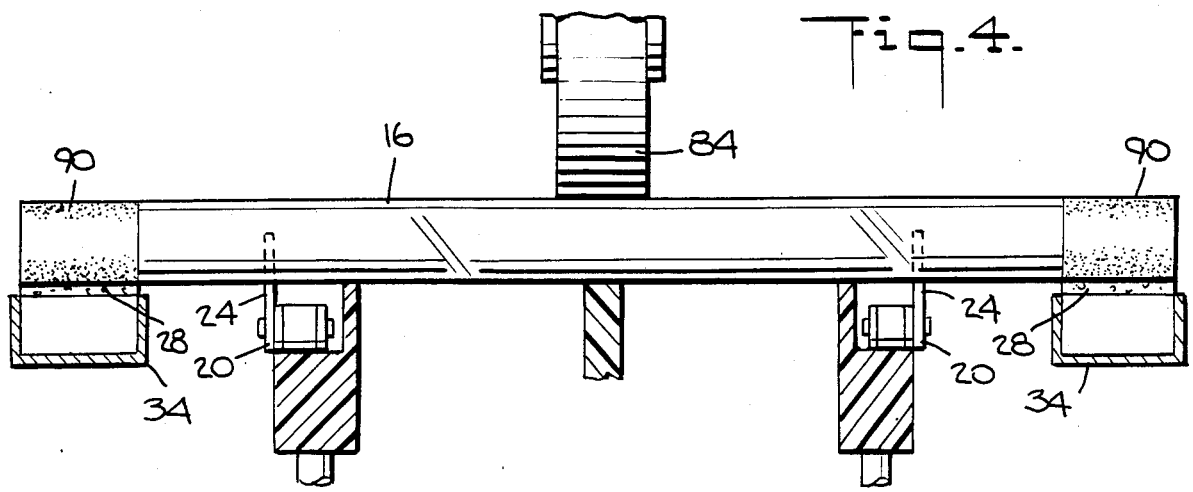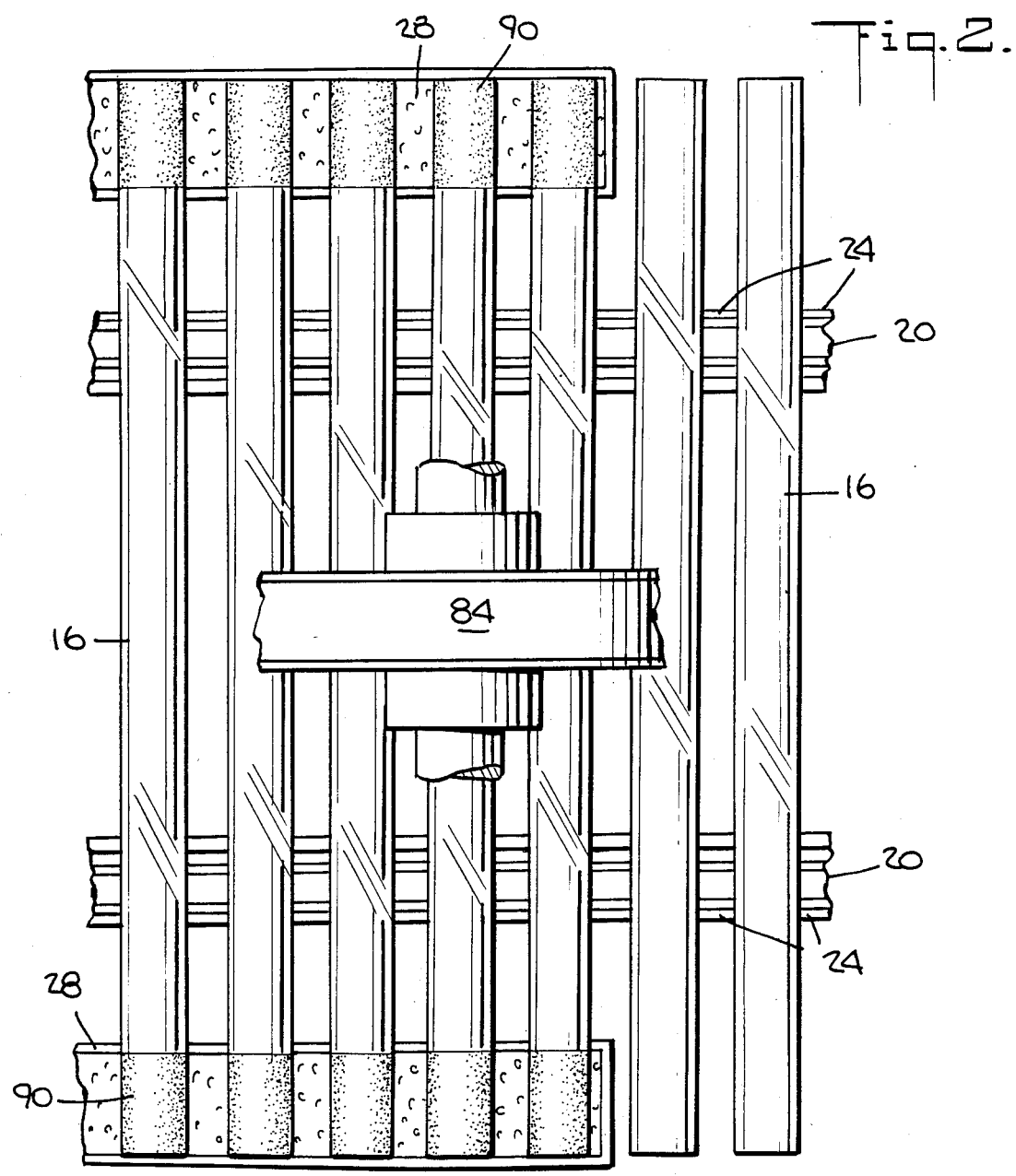

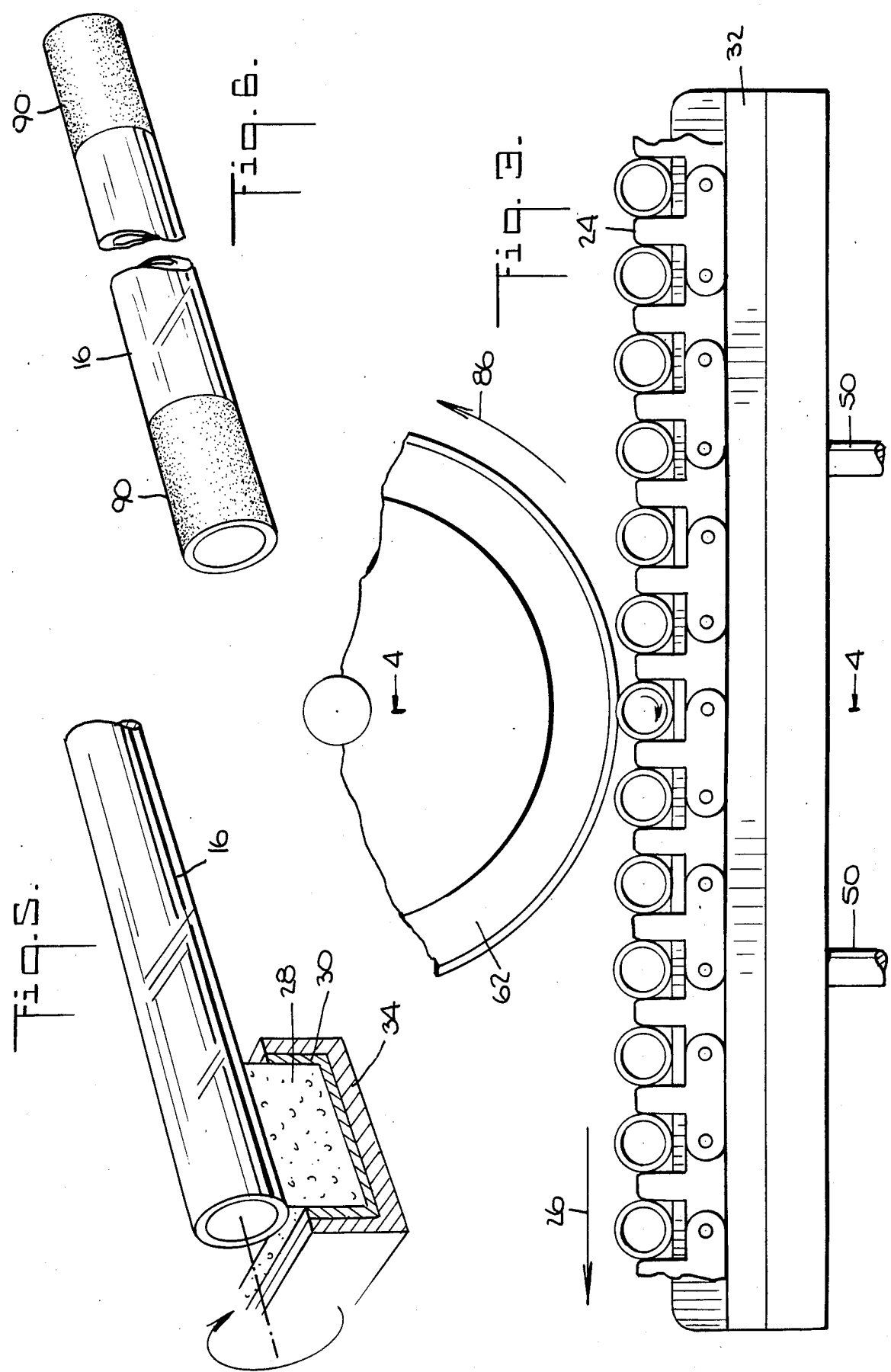

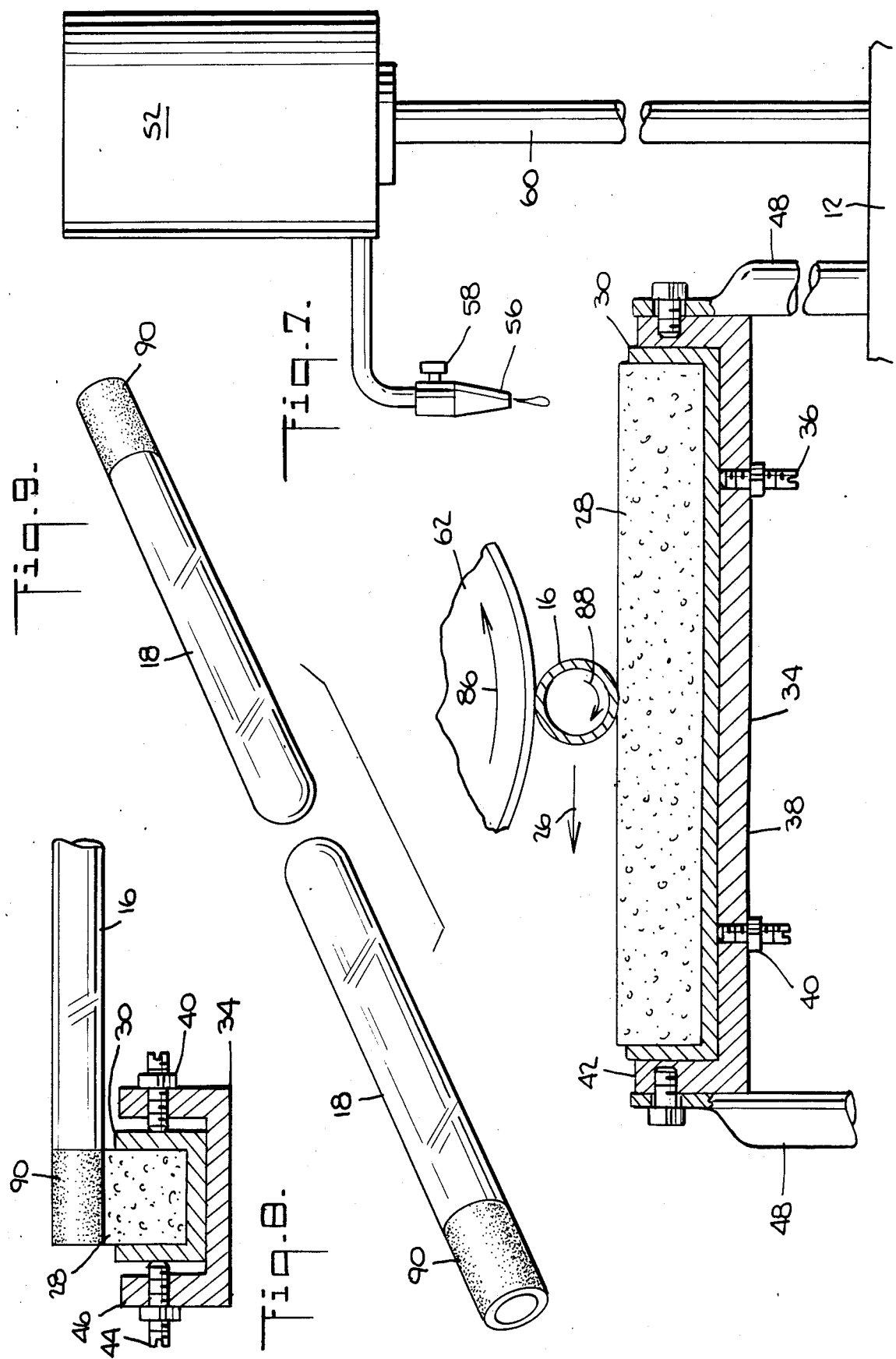

TEST TUBE MAKING AND END COATING

BACKGROUND AND SUMMARY OF THE INVENTION

This invention relates to test tubes which are adapted to be labeled for identification, content, and other purposes in clinical, research, laboratory and other applications.

The most pertinent prior art known to applicant consists of the following United States patents:

| | |
|---|---|
| 2,011,659 | Soyland |
| 2,045,876 | Schwab et al |
| 2,076,345 | Johnson et al |
| 2,167,589 | Schutz |
| 2,639,554 | Zons |
| 2,647,489 | Ryckman |
| 3,241,518 | Johnson |
| 4,077,355 | Miller |
| 4,089,294 | Lasiewicz et al |

Of these prior patents, the closest is believed to be Zons, U.S. Pat. No. 2,639,554. But neither Zons nor any of the other prior patents discloses the present invention as herein described.

Labeling bands are conventionally painted on test tubes by means of silk screen processes, but none of these processes, to applicant's knowledge, is capable of painting labeling bands in contiguous relation to the open end of the test tubes. Labeling bands, to the extent of their width, obscure the contents of the test tubes and limit their effective capacity. Their effective capacity is further limited to the extent of the spacing between the labeling bands and the open end of the test tubes which results from the use of the silk screen processes.

In the present invention, open-ended tubes (open at both ends) are conveyed to a paint applying station where both ends of each tube are left free to receive paint. The tubes are pre-heated (as in a heat-tempering operation) and they enter the paint applying station at a sufficiently elevated temperature to accelerate the drying of the paint that is applied to them. Following the paint application, the tubes are fused (heat sealed) and severed at the center to form two paint-banded test tubes from each open-ended tube.

Important in the present invention is the method used in applying paint to the open-ended tubes. The tubes are rotated while their ends are in wiping contact with paint applicators that, preferably, are stationary. The location of the paint applicators relative to the ends of the tubes determines the location of the painted band on the tubes. The width of the paint applicators determines the width of the painted band. Alternatively, if the painted band is to be contiguous with the open end of the tubes, the width of the painted band may be adjusted by adjusting the location of the paint applicators axially of the tubes.

BRIEF DESCRIPTION OF THE DRAWING

FIG. 2 is a fragmentary top view of said machine.

FIG. 3 is a fragmentary side view of said machine.

FIG. 4 is a vertical section on the line 4—4 of FIG. 3.

FIG. 5 is a fragmentary perspective view of the paint applicator.

FIG. 6 is a fragmentary vertical section showing the horizontal adjustment on one of the paint applicators.

FIG. 7 is another fragmentary vertical section, 90 degrees rotated from the section of FIG. 6, showing the vertical adjustment on one of the paint applicators.

FIG. 8 is a fragmentary perspective view of an open-ended tube following the painting operation.

FIG. 9 is an exploded perspective view of the two test tubes that are formed from fusing and severing the open-ended tube.

DESCRIPTION OF THE INVENTION

Figure 1:
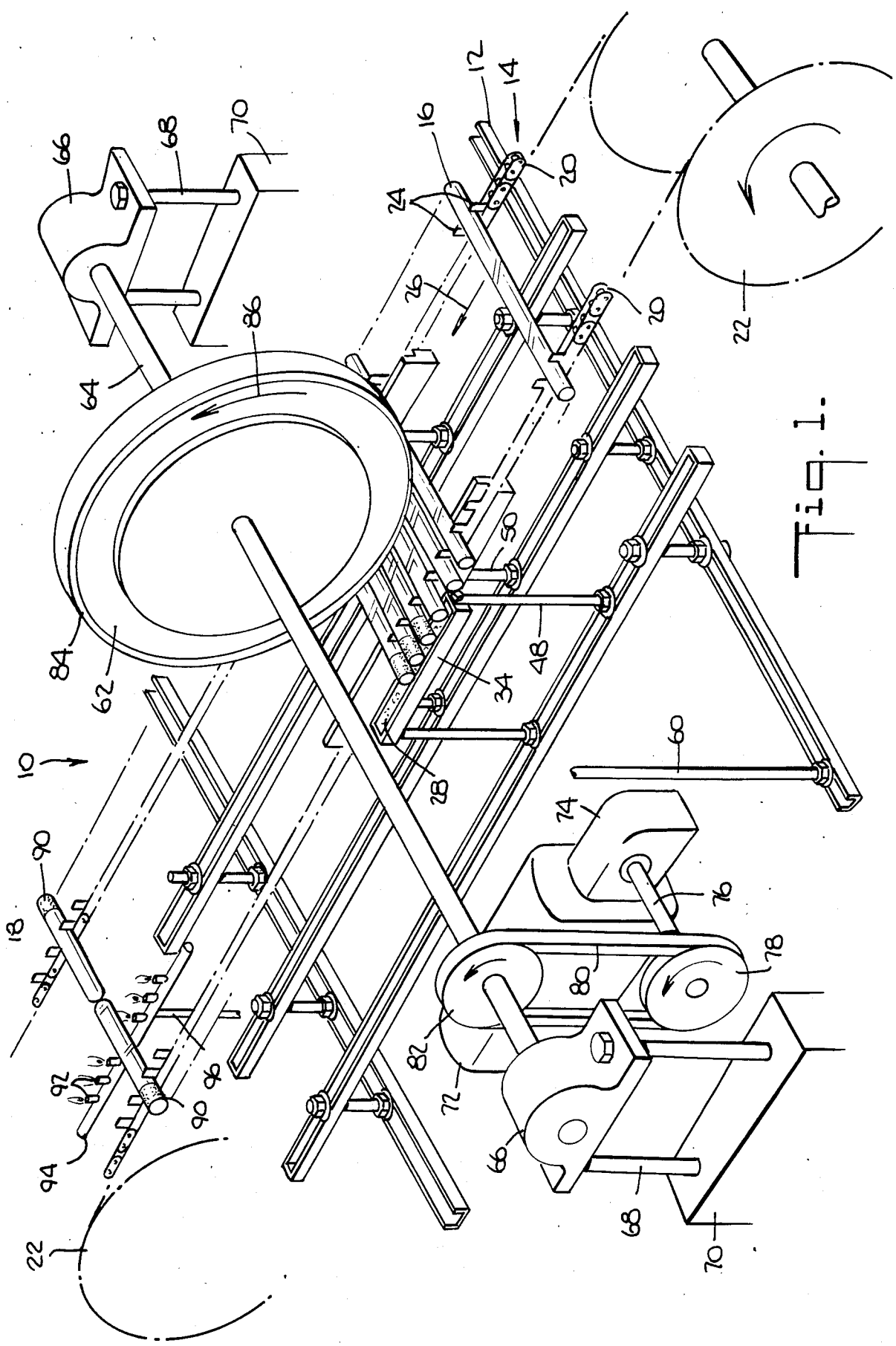
FIG. 1 is a perspective view of a test tube making and painting machine embodying the principles of this invention.

A test tube making and printing machine 10 made in accordance with the principles of the present invention is illustrated in FIG. 1. It includes a frame 12 that supports a conveyor 14 adapted to carry open-ended glass tubes 16 to and through painting and fusing stations where these tubes are painted and then fused and severed to form individual test tubes 18.

Conveyor 14 comprises a pair of chains 20 which are mounted on sprockets 22 driven by a conventional motor through a conventional speed reducing gear drive.

Fingers 24 on the conveyor chains hold the open-ended tubes in place, spaced from each other, their longitudinal axes perpendicular to the path of movement of the conveyor, the tubes being individually free to rotate about their respective longitudinal axes. Arrows 26 indicate the direction of rectilinear movement of the open-ended tubes on the conveyor.

The painting station is the location of paint applicator pads 28 supported in trays 30 located on both sides of the conveyor adjacent the ends of the open-ended tubes. It will be seen that the applicator pad trays 30 are vertically adjustable radially of the open-ended tubes, and that they are also horizontally adjustable parallel to the longitudinal axes of the open-ended tubes. The vertical adjustment is used to adjust the pressure between the applicator pads and the open-ended tubes; the horizontal adjustment is used to adjust the position of the applicator pads relative to the ends of said tubes.

Specifically, at the painting station the conveyor chains 20 ride on parallel horizontal bars 32 which support them in a fixed horizontal plane as they move through the painting station. Secured to the machine frame is a pair of tray holders 34 which carry the paint applicator pads 28. Adjusting screws 36 in the bottom wall 38 of tray holders 34 engage the bottom of the trays and adjust the vertical position of the applicator pads relative to the open-ended tubes. Nuts 40 lock the adjusting screws in adjusted positions.

The end walls 42 of the tray holders prevent longitudinal displacement of applicator pad trays 30 and function as guide elements for the trays when they are adjusted transversely of the path of movement of the conveyor chains. Adjusting screws 44 in side walls 46 of tray holder 34 engage the opposite side walls of applicator pad trays 30 and adjust the position of said trays longitudinally of the open-ended tubes.

It will be understood that the width of applicator pads 28 corresponds to the desired width of the band that is painted on the tubes, for example, half or three-quarters of an inch. The inner dimensions of the applicator pad trays correspond to the outer dimensions of the pads. To change from a half inch band to a three-quarter inch band, all that need be done is to substitute applicator pad trays from half to three-quarter inch pad dimensions. This method of determining the band width is, of course, purely illustrative.

It will further be understood, that the same adjusting screws 44 may be used to adjust the location of the bands on the open-ended tubes. FIG. 6 shows an applicator pad 28 positioned to paint a band at the precise end of the tube. Should it be desired to space the band from the end of the tube, adjusting screws 44 are adjusted to move the applicator pad tray 30 rightwardly, as viewed in FIG. 6, that is, toward the center of the tube.

Tray holders 34 may be supported on the machine frame 12 by means of posts 48 or by any other suitable supporting means. Chain supports 32 may be similarly supported on the machine frame 12 by means of posts 50 or by any other suitable supporting means.

The applicator pads are fed with ceramic or other suitable paint from a reservoir 52, through feed tube 54 and nozzle 56. A valve 58 in nozzle 56 controls the paint flow. The reservoir may be mounted on post 60 which is supported on frame 12 of the machine. When the reservoir is supported above the level of the applicator pads, as shown in the drawing, the paint will flow by gravity. When the reservoir is supported below the level of the applicator pads, a conventional pump or pressure feed will be used.

It will be understood that when the open-ended tubes enter the painting station they are caused to rotate about their longitudinal axes. This is accomplished when the conveyor carries the open-ended tubes into engagement with a wheel 62 which rotates about an axis which parallels the axes of the tubes. Specifically, wheel 62 is mounted on a shaft 64 which is journaled in bearing blocks 66. These bearing blocks are mounted on posts 68 which are themselves mounted on supports 70. A motor 72, operating through a speed-reducing gear box 74, shaft 76, pulley 78 and belt 80, drives pulley 82 which is fixed to shaft 64 and thereby causes wheel 62 to rotate.

The circumferential surface of the wheel 62 is covered with a material 84, e.g., silicone rubber, having a sufficiently high frictional coefficient relative to the glass material of which the open-ended tubes are made to cause the tubes to rotate responsive to the rotation of the wheel.

The direction of rotation wheel 62 is counterclockwise as viewed in FIGS. 1, 3 and 7 and as indicated by arrow 86. Frictional engagement between the wheel and the individual open-ended tubes as they are conveyed into the painting station causes the tubes to rotate in clockwise direction as indicated by arrow 88. This causes the tubes to wipe against the applicator pads and to acquire a coating of paint in the area of contact with the applicator pads.

It will be observed that the paint feed nozzles (one for each applicator pad) are located above the open-ended tubes in the illustrative machine shown in the drawing. This means that the paint which the nozzles discharge may drip on the tubes as well as on the applicator pads. This is immaterial since the paint that coats the tubes may come directly from the nozzles or from the pads or from both nozzles and pads. However the paint is applied to the tubes, the wiping action between the tubes and the pads spreads the paint uniformly around the tubes to form paint bands 90.

As above stated, one of the features of this invention is the quick-drying of the painted bands on the open-ended tubes. The tubes are preheated before they enter the painting station, as in a heat treating or tempering oven. They remain heated during the paint applying phase and the paint is thereby caused to dry and set relatively quickly. This makes it feasible to proceed with little delay into the next phase of the operation, namely, the tube fusing and severing phase.

The fusing and severing (firing) station of the machine is defined by the location of gas jets 92 on gas manifold 94. Gas is supplied to manifold 94 from a conventional gas source through gas line 96. As the band-painted open-ended tubes are carried through the fusing and severing station by conveyor 14, they are caused to rotate about their longitudinal axes by conventional means. The gas flames impinge on the open-ended tubes intermediate their ends causing each tube individually to fuse and sever and thereby form the closed ends of two test tubes, each having a painted band thereon at its open end.

I claim:

1. A test tube making and painting machine, comprising:
   a. a conveyor for glass tubes which are open at both ends,
   b. said conveyor being adapted to support said open-ended tubes in horizontal side-by-side, parallel relation to each other and to convey them in a path transverse their longitudinal axes,
   c. said conveyor having tube-engaging means engageable with the individual open-ended tubes at locations spaced from their open end and center portions,
   d. paint applying means supported adjacent the path of the conveyor for applying label paint to said open end portions of the open-ended tubes,
   e. tube rotating means engageable with said open-ended tubes to rotate them about their longitudinal axes relative to the paint applying means,
   f. whereby label paint is applied to the open-ended tubes to form tube-encircling painted labeling bands, and
   e. glass fusing means supported adjacent the path of the conveyor for application to the center portions of said rotating open-ended tubes,
   h. whereby each open-ended tube is centrally fused and severed to form two separate test tubes which are closed at their fused end and open at their painted end.

2. A test tube making and painting machine in accordance with claim 1, wherein:
   a. the paint applying means comprises a pair of applicator pads which are individually engageable with the ends of the open-ended tubes, and
   b. a paint feeder which supplies paint to the applicator pads.

3. A test tube making and painting machine in accordance with claim 1, wherein:
   a. the tube rotating means comprises a rotating wheel having an axis of rotation which is parallel to longitudinal axes of the open-ended tubes as they are conveyed by the conveyor,
   b. said rotating wheel being mounted for frictional engagement with the open-ended tubes intermediate their ends.

4. A test tube making and painting machine in accordance with claim 2, wherein:
   a. the paint applicator pads are of a width corresponding to the desired width of the paint band on the open-ended tubes, b. said paint applicator pads being replaceable with the same or different width paint applicator pads to provide paint bands of desired widths.

5. A test tube making and painting machine in accordance with claim 2, wherein:
   a. the paint applicator pads being adjustable radially of the open-ended tubes to adjust the contact pressure between them,
   b. and being axially adjustable relative to said open-ended tubes to adjust the location of the paint band thereon.

6. A method of making and painting test tubes, comprising the steps of:
   a. supporting open-ended glass tubes in horizontal, side-by-side relationship, their longitudinal axes parallel to each other,
   b. conveying said glass tubes in a path transverse their longitudinal axes,
   c. rotating said glass tubes about their longitudinal axes,
   d. applying label paint to said glass tubes adjacent their open ends while rotating said glass tubes,
   e. thereby forming tube-encircling painted labeling bands on said glass tubes adjacent their open ends,
   f. fusing said glass tubes at their center portions while rotating said glass tubes,
   g. thereby severing said glass tubes at their center portions and closing the severed ends to form two separate test tubes from each glass tube,
   h. each said individual test tube being closed at one end and provided at its open end with a painted labeling band.

* * * * *